E. G. GUNN.
MOTOR VEHICLE.
APPLICATION FILED MAY 19, 1919.

1,434,610.

Patented Nov. 7, 1922.

Inventor,
Earl G. Gunn,
By Milton Tibbett, Atty.

Patented Nov. 7, 1922.

1,434,610

UNITED STATES PATENT OFFICE.

EARL G. GUNN, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed May 19, 1919. Serial No. 298,169.

*To all whom it may concern:*

Be it known that I, EARL G. GUNN, a citizen of the United States, and resident of Detroit, Wayne County, State of Michigan, have invented certain new and useful Improvements in Motor Vehicles, of which the following is a specification.

This invention relates to motor vehicles and particularly to improvements in the steering cross tubes thereof.

The object of the invention is to provide effective means for closing the flexible joint between the steering cross tube and the steering knuckle lever in order to exclude dust from the bearings between these parts.

With this object in view, the invention is embodied in preferable form, in the construction hereinafter described and illustrated in the accompanying drawings.

Figure 1:
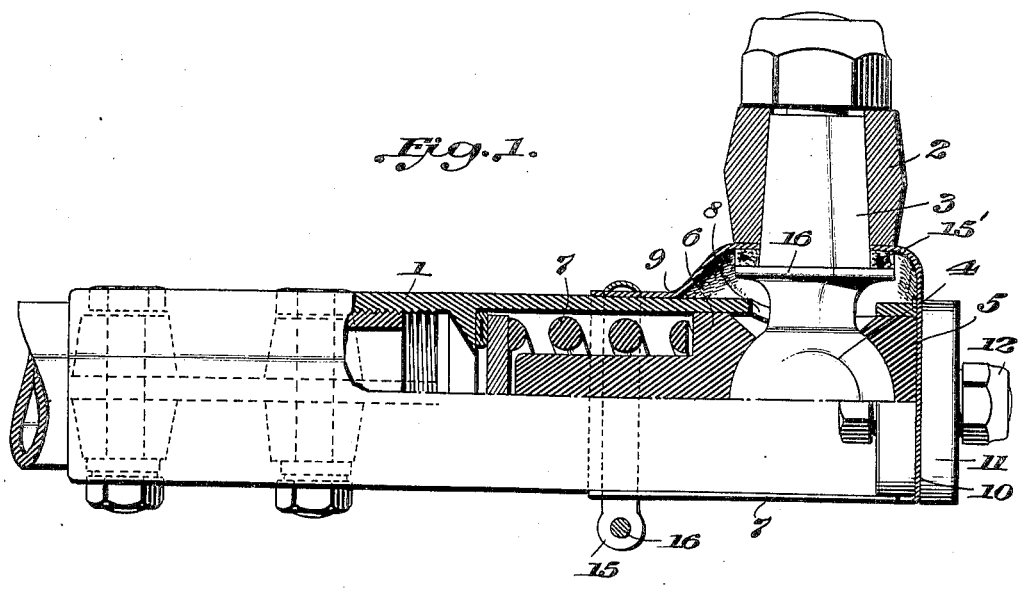
Figure 2:
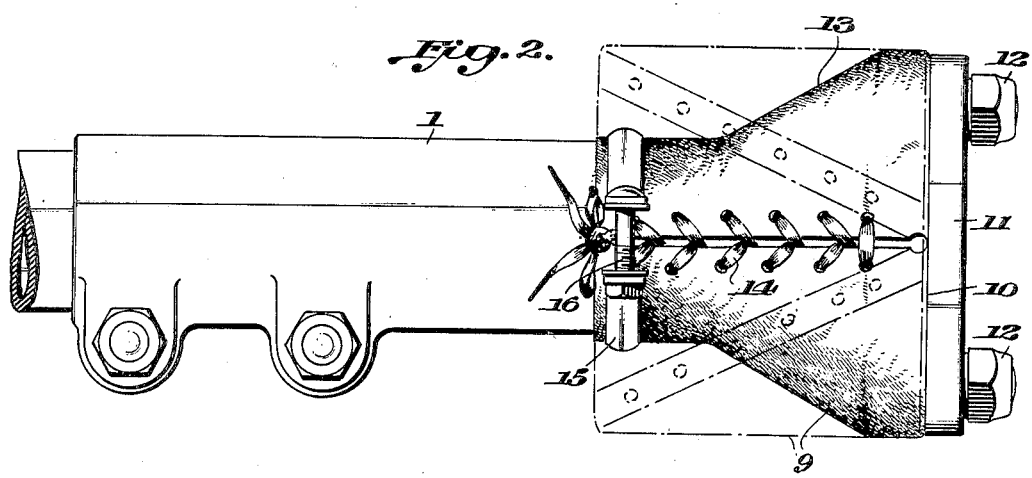

In these drawings, Fig. 1 is a front view in elevation, showing part of a steering cross tube of a motor vehicle, and Fig. 2 is a bottom plan view of the same part.

Referring to the drawings, 1 indicates a steering cross tube of usual construction adapted to extend transversely of the motor vehicle in order to connect the steering knuckle levers. 2 indicates the head of a steering knuckle lever, the arm of which is not here shown, and which is adapted to be connected to the member 1 by means of a universal joint consisting of a member having a tapered stud 3 on which the head 2 is mounted and a ball 4 extending within the cross tube 1. The connection between the universal joint member and the cross tube is obtained, as is customary, by means of a rigid abutment 5 and a yielding abutment 6 adapted to be pressed into contact with the ball by means of a spring 7.

The neck of the pivot or joint member passes through an opening 8 in the cross tube 1 and it is necessary to close this opening in order to exclude dirt and dust from the bearing surfaces between the universal joint member and the abutments of the cross tube. Several different constructions have been heretofore employed for this purpose but objections in regard to effectiveness, simplicity or durability exist with respect to all of them. In my invention, the means for covering this opening and excluding the dirt and dust from the bearings comprises an enclosing cover of leather 9 forming a boot which circumferentially surrounds the steering cross tube and extends over the opening 8. The outer end of this boot is turned in to provide an overlapping portion 10 which is clamped against the rigid abutment 5 of the cross tube by means of a cap 11 and nuts 12 whereby the boot is held firmly in place at one end. The outer end of the steering cross tube is enlarged substantially elliptically as indicated at 13 and the boot is formed to accommodate itself to this formation of the tube and also to the reduced portion thereof. In Fig. 2 the form of the boot before application to and the fastening of the same around the tube is indicated in dotted lines. It will be seen that the boot is split longitudinally and the edges are adapted to be joined so as to tighten the same around the tube and thus retain it in place, by means of lacings 14. Adjacent its inner end the boot is further secured by means of an annular band 15 having a clamping screw 16 by which it is tightened against the boot. The boot is perforated opposite the upper surface of the cross tube in order to receive the stud 3 of the universal joint member. The edge of the boot around the opening closely grips the stud 3 and is clamped between the lower edge of the head 2 and a yielding gasket or washer 15' of cork, which bears against and is supported by the annular flange 16 of the member 3. It will be noted that sufficient material is utilized in the cover 9 to provide for a loose fit around the opening 8 in the cross tube, thereby permitting free movement between the stud 3 and the steering cross tube 1. By this arrangement, not only is a tight joint around the member 3 maintained at all times notwithstanding the movement between the universal joint member and the cross tube, but also a seal is provided at the outer end of the tube such as will prevent the entrance of dirt and dust.

Having thus described my invention, what I claim and desire to secure by Letters Patent is:

1. In a motor vehicle, in combination with a steering cross tube having an opening therein, and a knuckle lever head, a universal joint member extending through said opening and engaging said lever, a flexible cover surrounding said member and extending over said opening to cover the same, a flange on said member, said cover being clamped between the said head and flange.

2. In a motor vehicle, in combination with a hollow part and another part to be connected by a universal joint member having a ball entering said tubular part, a flexible cover surrounding said member, a flexible washer adjacent said cover and a flange on the joint member between which and one of said connected parts said cover and washer are clamped.

3. In a motor vehicle, in combination with a steering cross tube, a knuckle lever head to be connected thereto, a stud and ball universal joint member connecting said head and tube, a flange on said stud, a cover of flexible material having an opening through which said stud passes and having the edge surrounding said opening clamped between the head and flange, a cork washer between the cover and flange, and means to secure said cover to said tube.

4. In a motor vehicle, in combination with a steering cross tube, a knuckle lever head, a universal joint member connecting said parts, a flexible cover surrounding the tube and clamped thereto near each end of the cover, lacing means for said cover, a flange on said member, said cover being apertured to surround said member and being clamped between said head and flange and a cork washer interposed between said cover and flange.

In testimony whereof I affix my signature.

EARL G. GUNN.